UNITED STATES PATENT OFFICE.

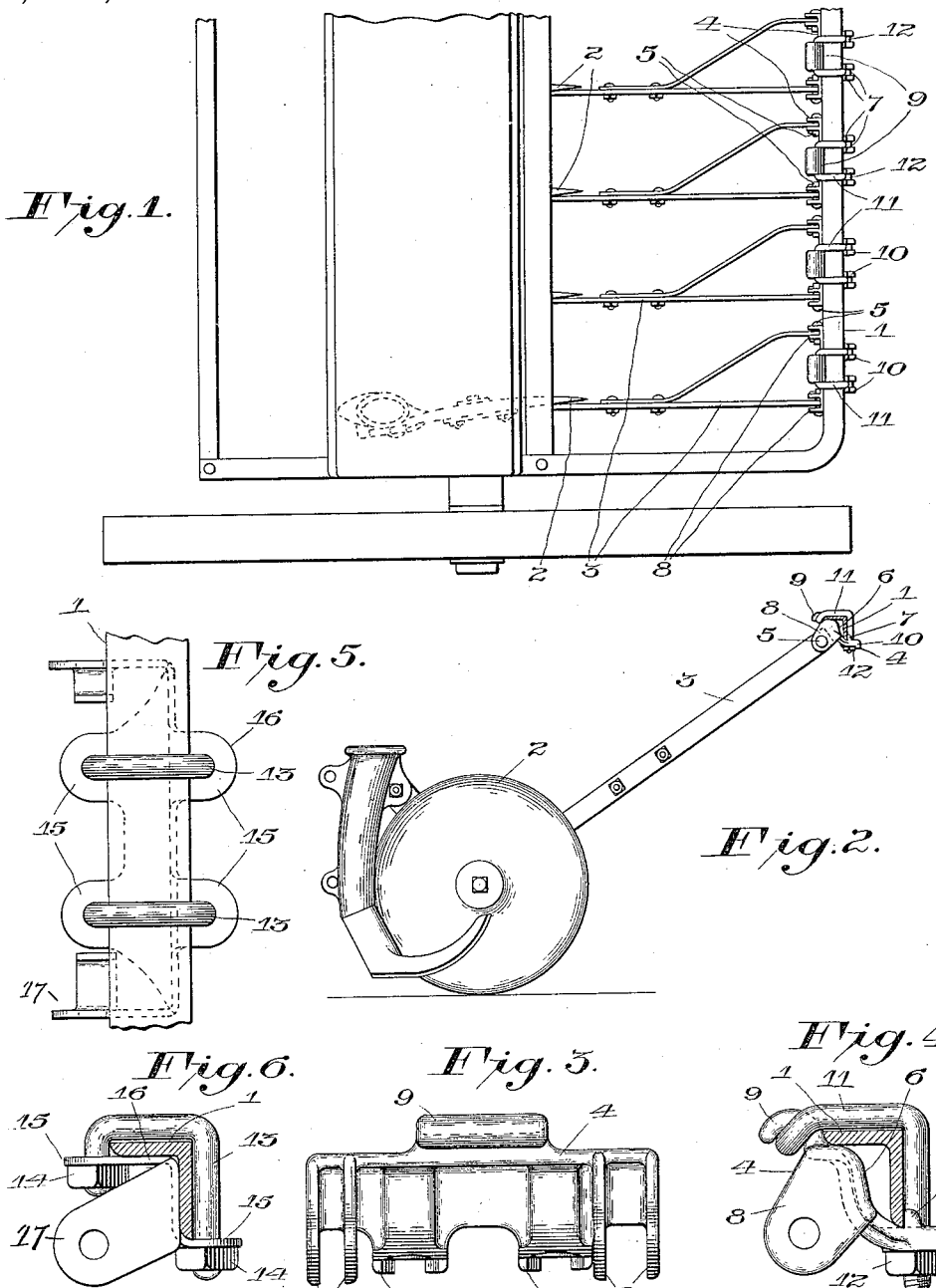

DUNY A. SCHUTT, OF CHICAGO, ILLINOIS, ASSIGNOR TO INTERNATIONAL HARVESTER COMPANY OF NEW JERSEY, A CORPORATION OF NEW JERSEY.

DRAG-BAR ATTACHMENT.

1,170,117.  Specification of Letters Patent.  Patented Feb. 1, 1916.

Application filed August 27, 1913. Serial No. 786,955.

*To all whom it may concern:*

Be it known that I, DUNY A. SCHUTT, a citizen of the United States, residing at Chicago, in the county of Cook and State of Illinois, have invented certain new and useful Improvements in Drag-Bar Attachments, of which the following is a full, clear, and exact specification.

My invention relates to drag bar attachments for grain drills, harrows and the like.

It has for its objects to attach a ground tilling member to its support in an improved manner.

A further object of my invention is to adjust a ground tilling member with respect to its support in an improved manner.

I attain these objects by providing improved means connecting the drag bar of a ground tilling member to the machine frame and adjustable with respect to the latter in an improved manner.

In the accompanying drawings I have shown one embodiment which my invention may assume in practice, illustrating the same in connection with a grain drill. It is to be understood, however, that the form thereof shown herein is susceptible of modification.

Figure 1 is a top plan view of a portion of a grain drill showing the disk drag bars attached thereto. Fig. 2 is a side elevation of one of the drag bars and attaching means, the support being shown in section. Fig. 3 is a side elevation of a part of the attaching means. Fig. 4 is an end view of the same attached to the support. Fig. 5 is a top plan view of a modified form of attaching means attached to the support. Fig. 6 is an end view of the same.

The construction shown, when broadly considered, comprises a drill frame 1 having a plurality of disks 2 attached thereto through rearwardly extending drag bars 3 and improved attaching means hereinafter described; the several disks being independently adjustable laterally along the frame 1.

The frame 1 may be of any desired construction. In the form illustrated it is shown to be of the angle iron or steel type in general use on grain drills and all of the disks 2 are attached to the same portion or draft bar thereof. These disks may likewise be of any desired construction. In the form shown herein they are rotatably mounted upon suitable bearings carried at the rear ends of the drag bars 3. These drag bars are shown to comprise two coöperating members, one of which is rigidly attached to the other at a point intermediate the ends of the latter and protrudes therefrom so that its free end is substantially parallel to the extremity of the other. The ends of these coöperating members are pivotally connected to an attachment member 4 by pins 5, as shown in Figs. 1 and 2. This member 4 is preferably formed in a single elongated casting of curved cross section provided with a longitudinally extending ridge 6 upon the front end thereof adapted to abut against the under side of the angle iron 1, as well as upstanding lugs or projections 7 which are adapted to position the attachment member with respect to the depending flange of the angle iron. Upon the opposite side of the casting 4 parallel rearwardly protruding lugs 8 are provided which are adapted to receive between them the ends of the drag bars 3. As shown in Fig. 4, each casting is also provided with a rearwardly projecting elongated curved lip 9 on its rear end and at its front end is provided with a plurality of forwardly extending spaced lugs 10. Coöperating with each lip 9 and each set of lugs 10 is a single substantially L-shaped U-bolt 11 hooked over the lip 9 and extending around the frame member 1. As shown, this bolt has its free ends protruding downwardly between the lugs 10 and clamped thereto by nuts 12 to position the casting 4 upon the support 1, the nuts themselves being engageable with depending portions of the lugs 10 to limit any possible longitudinal shifting of the bolt 11 in the slots formed by the lugs 10.

In the construction shown in Figs. 5 and 6, instead of using a single U-bolt for holding each casting in position, I employ a plurality of U-bolts 13, each U-bolt in this instance being provided with a short and a long threaded arm adapted to receive nuts 14 and clamp oppositely extending projections 15 on the attaching member against the support 1. As shown in Fig. 6, the attaching member in this construction is also modified, being formed of a single piece of stamped sheet steel 16 fitted snugly against the webs on the angle member 1 and provided with oppositely disposed integral projections 15 protruded in substantially parallel planes in such a manner that when the U-bolts 13 are in position, the whole attaching means is very securely attached to the angle member 1. Obviously in this construction the drag bars 3 may be attached to the attaching member in any suitable manner, as by attaching the same to parallel rearwardly disposed arms 17 formed integral with the attaching member and disposed at right angles to the vertical flange thereof, the said arms corresponding in general to the lugs 8 shown in Fig. 4.

When it is desired to adjust one of the disks 2 with respect to its support 1, this may be readily accomplished by loosening the nuts upon the bolts 11 or 13 and then sliding the members 4 or 16 to the desired position. When it is desired to remove the drag bars, obviously they may be separated from the frame by simply removing the nuts so that the U-bolts may be readily separated from the members 4 or 16. It is to be noted that in my improved construction the drag bars may be adjusted in any desired position upon the support independently of each other and that the means employed for attaching the same to the support act to clamp the same rigidly thereto in such a manner that accidental movement of the same is effectually prevented. It is further to be noted that whenever it is desired to remove the drag bar, the same may be very readily detached from the frame by a simple manipulation of means readily accessible from the front end of the frame.

While I have in this application described one embodiment which my invention may assume in practice, it is of course to be understood that the forms shown herein for purposes of illustration may be modified without departing from the spirit of my invention.

What I claim as my invention and desire to secure by Letters Patent of the United States is:—

1. In a drag bar attachment, a support of substantially right angled cross section, a drag bar attachment member seated between the flanges thereon having extensions protruding beyond the edges of said flanges, and a clamping member extending around the opposite side of said support from said attachment member and attached to said extensions.

2. In a drag bar attachment, a support of substantially right angled cross section, a drag bar attachment member having its body portion seated between the flanges on said support and oppositely disposed laterally projecting extensions extending beyond the edges of said flanges, and a substantially L-shaped clamping member extending around the opposite side of said support from said attachment member and attached to said extensions.

3. In a drag bar attachment, a support, an attachment member having portions thereof engaging one side of said support and positioning said member with respect to said support, said attachment member having a lip protruding from one side thereof beyond one edge of said support, and a U-bolt having the bight thereof fitted over said lip and its ends attached to said attachment member on the opposite side of said support from said lip, and having its body portion extending around the opposite side of said support from said attachment member.

4. In a drag bar attachment, a support, an attachment member having portions thereof positioning the same with respect to said support and a lip protruding from one end thereof, a U-bolt having the bight thereof fitted over said lip and its ends fixed to said attachment member and clamping the latter to said support, and a drag bar connected to said attachment member.

5. A drag bar attachment member comprising a body portion having a longitudinally extending shoulder thereon and substantially parallel rearwardly disposed drag bar attachment lugs formed on its ends, said attachment member being provided at points on opposite sides of its body portion with substantially oppositely disposed extensions disposed in different planes, one of said extensions being in the form of a hook while the others are provided with upstanding lugs.

6. In a drag bar attachment, a support of substantially right angled cross section, an attachment member having a shoulder abutting against one of the flanges thereof and extensions projecting in opposite directions beyond the edges of said flanges, certain of said extensions having means thereon engaging another of said flanges, and a U-bolt having the bight thereof fitted over certain of said extensions and its ends attached to the certain others of said extensions, said U-bolt extending around the opposite side of said support from said attachment member.

7. In a drag bar attachment, a support formed of angle material, an attachment member having a lip on one edge thereof, a shoulder engaging the horizontal under surface of said support, a lug engaging the outer vertical surface of said support, a plurality of substantially parallel lugs protruding from one side of the same intermediate said lug and said lip, a U-bolt of substantially L shape having the bight thereof fitting over said lip and the ends thereof attached to said attachment member and clamping the support between said U-bolt and said attachment member, and a drag bar pivotally connected to the parallel lugs on said attachment member.

In testimony whereof I affix my signature, in the presence of two witnesses.

DUNY A. SCHUTT.

Witnesses:
 JAMES W. KEOGH,
 CHAS. E. WILLIS.

Copies of this patent may be obtained for five cents each, by addressing the "Commissioner of Patents, Washington, D. C."